Figures 1, 2, 3, 4, 5:
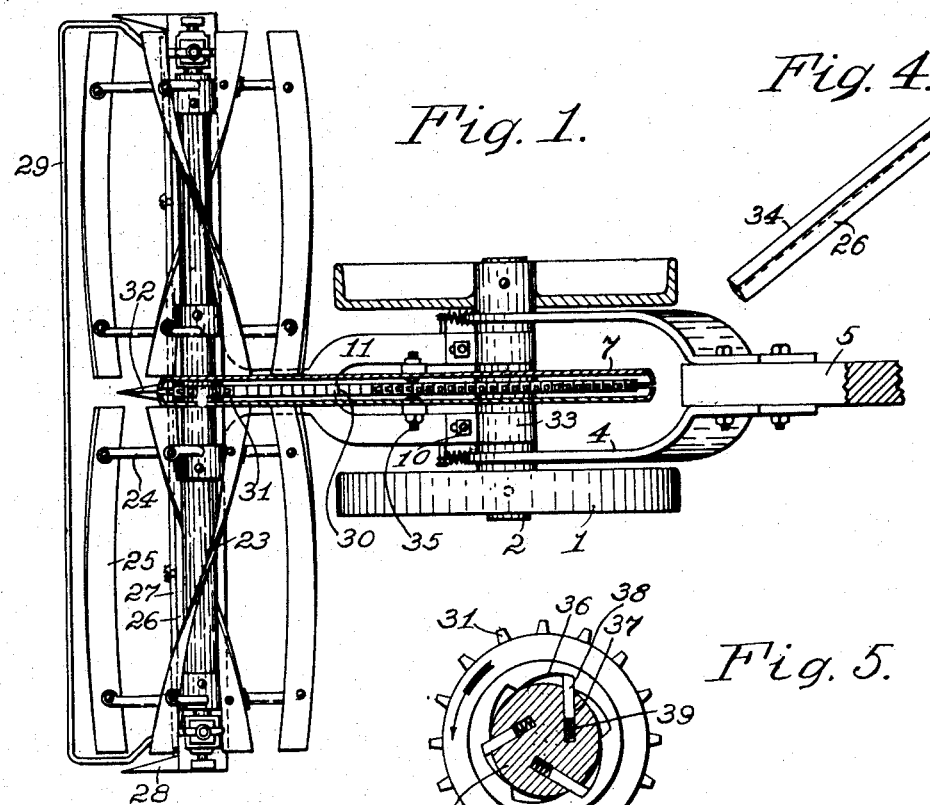

Oct. 14, 1930. H. J. KUHLMAN 1,778,219
LAWN MOWER
Filed Dec. 1, 1927

Inventor
Henry J. Kuhlman
By G. E. Kennedy
Attorney

Patented Oct. 14, 1930

1,778,219

UNITED STATES PATENT OFFICE

HENRY J. KUHLMAN, OF COLESBURG, IOWA, ASSIGNOR TO E. D. NEIKIRK, OF RAVENNA, OHIO

LAWN MOWER

Application filed December 1, 1927. Serial No. 237,017.

My invention relates to improvements in lawn mowers, and the object of my improvements is to furnish a simple, inexpensive, manually propellable device of this class, adapted to shear grass along its whole transverse width.

Another object of my improvements is to supply for use with the device a double edged shearing knife whose edges are to be used in succession and removably reversibly mounted.

Another object is to provide traveler wheels mounted medially of the device to give clearance at the sides thereof within the scope of the cutting elements.

Another object is to provide gathering fingers positioned at the outer ends and between the cutting elements transversely to direct grass within their scope upon the cutters for close shearing at the ends of the device.

Other objects will be more specifically referred to in the description hereinafter given.

The above objects I have accomplished by the means which are hereinafter described and claimed, and which are illustrated in the accompanying drawings, in which Fig. 1 is a top plan of my improved lawn mower with portions removed or sectioned. Fig. 2 is a side elevation of the device, also with portions removed or broken away. Fig. 3 is a fragmental rear elevation of one end part of the cutting elements with their roller supporting means, parts being in cross section. Fig. 4 is a detail perspective view of one of the removable double-edged cutter blades only. Fig. 5 is an enlarged cross section of the axial shaft and hub of the forward sprocket wheel mounted thereon by means of an intermediate ratcheting device.

My invention is not restricted to the precise construction and arrangement of parts herein shown and described, nor to the various details thereof, as the same may be modified or rearranged in various particulars without departing from the spirit and scope of my invention, one practical embodiment of which has herein been illustrated and described without attempting to show all of the various forms and modifications in which my invention might be embodied.

My improved lawn mover has a relatively short shaft extending horizontally and transversely in the middle rear of the cutters, and carrying wheels 1 are secured upon the ends of this shaft, spaced apart, to rotate therewith, the shaft carrying intermediate the carrying wheels 1 a relatively large sprocket wheel 6 carrying the rear reach of a sprocket chain 30. A handle 5 is positioned directly at the rear of said sprocket wheel and has furcations 4 pivotally mounted upon the shaft 2 close to the carrying wheels 1.

The numeral 20 denotes another rotatable shaft in advance of said shaft 2, parallel therewith, and but little higher, if any, than the shaft 2 from the ground beneath. This shaft 20 is resiliently adjustably supported in the following manner. A ground roller 14 is mounted rotatably immediately to the rear of the shaft 20 with its end pintles mounted pivotally in bearing eyes in short arms 13 whose upper ends are secured by pivot-bolts 12 for swinging adjustments to rearwardly directed lugs on reversely offset standards 15 whose upper parts are curved inwardly and then continued upwardly integrally as hollow boxings 16. Within these boxings are mounted short coiled compression springs 17 supporting bearings boxes 18 which are transversely apertured to receive the diminished terminations of the shaft 20 and also the housed anti-friction balls 19 around them. In the upper closed ends of the standards set-screws 21 are seated in threaded apertured seats to bear endwise against the tops of the bearing-blocks 18 for adjustably tensioning the springs 17 and lowering the shaft 20 while keeping it parallel to the ground surface below.

The numeral 11 denotes a rearwardly bifurcated arm secured in front to a transverse frame-bar 27 which rigidly connects the lower ends of the standards 15. The furcations of the arm 11 extend rearwardly toward the shaft 2 and have split-sleeve terminations 33 which are loosely seated upon the shaft 2 between the carrying wheels 1 and the sprocket-wheel 6, the forward terminations of these split sleeves being slotted with the parts of the arm beneath to receive securing bolts 10. A little in advance of the split-sleeves 33 are raised lugs on the furcations of the arm 11 and these lugs are secured to bipartite housings 7, apertured to be seated on the shafts 2 and 20, by bolts 35. The slots in the split sleeves permit of some adjustments to keep the sprocket-chain 30 taut as reeved about the large rear sprocket 6 and about the forward smaller sprocket 31, the former mounted within said housing 7 by a ratcheting connection upon the middle of said shaft 20.

This ratcheting connection is shown in Fig. 5, and is of a well known type, wherein obliquely directed sockets 37 in the shaft 20 seat first light coiled compression springs 39 supporting projecting detent bodies 38 whose beveled terminations engage a circumferential series of sloping detents 36 on the inner wall of the axial bore of the small sprocket 31. When the mower is propelled in one direction, the detent bodies 38 engage the abrupt shoulders of the sprocket detents 36, whereby the sprocket is rotated with the shaft 20, but when the mower is propelled in an opposite direction, the detent bodies 38 drag slippingly over the more sloping edges of the sprocket detents 36 so that the sprocket 31 remains idle upon the shaft 20.

The lower frame bar 27 is longitudinally grooved along its upper face to seat therein a removable reversible shearing cutter blade 26. The opposite longitudinal edges of the blade 26 are edged acutely and the blade is mounted in the groove of the bar 27 with one edge within the groove, the other edge projecting above the bar as shown in Fig. 2. Arms 24 are fixed radially upon the shaft 20 in two sets of transversely spaced pairs. On each transversely positioned pair of arms is fixed a spirally shaped blade 25, the advancing end of each blade being the outer end thereof, whereby grass cut by the blades 23 and 26 is propelled toward the middle of the device, to thereby remain upon the ground as a longitudinal swath midway of the mower. The action of the spiral blades 25 upon and coacting with the transverse blade 26 is a shearing cut upon grass. When the exposed working edge of the blade 26 is worn down to be dull, the blade is to be removed from its seat, reversed and re-seated in the groove in the basal bar 27 for use of the other longitudinal cutting edge, but after dulling of this edge, the blade is removed, discarded, and replaced by a fresh sharp blade, because these blades are inexpensive.

The rotary blades 25 are thus arranged in separated assemblages circumferentially around the shaft 20, and a guard bar 29 is mounted upon the upper parts of the side standards 15 to encompass the said rotary blades in front.

It will be seen that the outer ends of the rotary blades 23, as also those of the stationary lower blade 26, terminate at the extreme outer sides of the front part of the mower, because of the outwardly offset standards 15 and the clearance provided within these for the ends of the rotary blades. However to insure the cutting of grass to the extreme outer limits of the mower, I have mounted forwardly projecting pointed gathering fingers 28 on the base bar 27 just beyond the ends of the blade 26 laterally, which enter the grass at the sides and direct that portion thereof at each side of the mower which is within the inner wall of the fingers by bending into the cutting range of the rotary and stationary blades. At the middle of the base-bar 27 I have fixed a similar gathering finger 32 positioned medially between the inner terminations of the rotary blades 23, and which finger 32 serves similarly to sweep to either side thereof under the rotary blades, grass which stands in the middle line of the mower.

The cutters may be adjustingly lowered to cut closer to the ground, by swingingly adjusting the position of the ground roller 14 after loosening the nuts on the bolt 12 securing the side arms 13.

It will be seen that my improved mower cuts the grass cleanly to the extreme outer limits thereof, and abutting curbs, walks or other limiting structures or the edges of walks.

Referring to Fig. 2, the numeral 42 denotes a like pair of forwardly projecting rigid fingers on the furcations 4, and the numeral 41 denotes coiled springs connected between the fingers 42 and pins 40 on the other furcations 11. When the operator bears down upon the handle 5, the springs 41 are compressed, to resiliently support part of the weight of the forward part of the mower without lifting the same from the ground and while passing over roughnesses below.

Having described my invention, what I claim as new, and desire to secure by Letters Patent, is:

1. In combination, a propellable frame including a base bar extending along the frame transversely, and having a longitudinal grooved seat in its upper face, an elongated thin double edged blade having one edge removably seated in said grooved seat with the other edge projecting upwardly, and a rotary device mounted upon the frame to coact shearingly with the exposed edge of said blade in cutting grass or the like against which the same is propelled.

2. In combination, a frame structure, rotatable transverse shafts mounted thereacross, cutter blades mounted on the forward shaft and spaced medially, a relatively fixed cutter blade mounted across the forward part of said structures to coact shearingly with said cutter blades, carrying wheels fixedly mounted upon the rear shaft to the rear of said cutter devices and intermediate their ends, a sprocket-wheel mounted on the rear shaft between said carrying-wheels, a sprocket wheel mounted on the forward shaft intermediate its spaced cutter blades, a sprocket-chain connecting said sprocket-wheels, and a bipartite housing for said sprocket-gearing comprising like but reversed cupped halves inclosing the gearing separably.

3. In combination, in a grass mower, a frame containing an upwardly opening blade seat extending transversely across it, and a relatively narrow elongated blade having both longitudinal edges angulary sharpened, with one longitudinal edge removably seated in said blade seat to cause the blade to project beyond said seat in presenting its other cutting edge in a position to coact with means for drawing grass in its path thereacross shearingly.

4. In combination, a propellable frame, a rotatable shaft mounted transversely therein having outwardly extending longitudinal blades arranged in medially spaced pairs therealong, a removable reversible double edged blade mounted in the frame below said rotatable blades and to coact shearingly therewith, and grass gathering fingers fixed on said frame at each end of said double edged blade and medially relative thereto to deliver and direct grass upon and between the coacting blades.

In testimony whereof I affix my signature.

HENRY J. KUHLMAN.